(12) United States Patent
Contarino, Jr.

(10) Patent No.: US 9,289,097 B2
(45) Date of Patent: Mar. 22, 2016

(54) APPARATUS FOR CONVERTING HINGED-LID COOKING GRILLS FOR COOKING PIZZA

(71) Applicant: Alfred F. Contarino, Jr., Boxford, MA (US)

(72) Inventor: Alfred F. Contarino, Jr., Boxford, MA (US)

(73) Assignee: AFC Business Ventures, LLC, Boxford, MA (US)

( * ) Notice: Subject to any disclaimer, the term of this patent is extended or adjusted under 35 U.S.C. 154(b) by 0 days.

(21) Appl. No.: 14/732,855

(22) Filed: Jun. 8, 2015

(65) Prior Publication Data

US 2015/0289719 A1    Oct. 15, 2015

Related U.S. Application Data (63) Continuation of application No. 14/203,965, filed on Mar. 11, 2014.

(60) Provisional application No. 61/776,132, filed on Mar. 11, 2013.

(51) Int. Cl.
*A47J 37/07*    (2006.01)

(52) U.S. Cl.
CPC .................................. *A47J 37/0786* (2013.01)

(58) Field of Classification Search
CPC ..................................................... A47J 37/0786
USPC ........................................................... 99/341
See application file for complete search history.

(56) References Cited

U.S. PATENT DOCUMENTS

| | | |
|---|---|---|
| 833,529 A | 10/1906 | Jones |
| 1,751,219 A | 3/1930 | Seamon et al. |
| 2,015,295 A | 9/1935 | Steingruber |
| 2,127,146 A | 8/1938 | Smallen |
| 2,155,654 A | 4/1939 | Haley |
| 2,430,582 A | 11/1947 | Reich |
| 2,709,996 A | 6/1955 | Tescula |
| 2,898,846 A | 8/1959 | Del Francia |
| 2,940,381 A | 6/1960 | Cottongim et al. |
| 3,152,242 A | 10/1964 | De Mott |
| 3,169,517 A | 2/1965 | Maier |
| 3,199,438 A | 8/1965 | Myler et al. |
| 3,443,510 A | 5/1969 | Norton |
| 3,490,433 A | 1/1970 | Busenbarrick |
| 3,611,912 A | 10/1971 | Choc |
| 3,783,855 A | 1/1974 | Newinger |
| 3,802,413 A | 4/1974 | Pepin |
| 3,938,494 A | 2/1976 | Clark |
| 3,947,657 A | 3/1976 | Ershler |

(Continued)

FOREIGN PATENT DOCUMENTS

| | | |
|---|---|---|
| DE | 3926182 A1 | 2/1991 |
| GB | 2143119 A | 2/1985 |

*Primary Examiner* — Jianying Atkisson
(74) *Attorney, Agent, or Firm* — Saul Ewing LLP (57) ABSTRACT

An accessory is provided for adapting cooking grills, especially grills including a hinged lid, for improved cooking of pizzas and other foods. The accessory includes a body adapted to be disposed between the base and lid portions of the cooking grill, the body being configured to mate with an inner surface of the lid and to cooperate with the base and lid portions to define therebetween a substantially-enclosed cooking chamber when the lid is positioned in a partially-closed position between the open and closed positions. A hinged-lid grill including the accessory is provided also.

20 Claims, 10 Drawing Sheets

(56) References Cited

U.S. PATENT DOCUMENTS

| | | | |
|---|---|---|---|
| 4,220,133 A | 9/1980 | Way, Jr. | |
| 4,362,093 A | 12/1982 | Griscom | |
| 4,392,419 A | 7/1983 | Bonny | |
| 4,516,485 A | 5/1985 | Miller | |
| 4,531,505 A | 7/1985 | Hait et al. | |
| 4,598,634 A | 7/1986 | Van Horn, II | |
| 4,718,400 A | 1/1988 | Lotz et al. | |
| 4,777,927 A * | 10/1988 | Stephen | A47J 37/0713 126/25 R |
| 4,800,865 A | 1/1989 | Setzer | |
| 4,840,118 A | 6/1989 | Rinehart | |
| 5,088,470 A | 2/1992 | James, Jr. et al. | |
| 5,186,159 A | 2/1993 | Crow, Jr. et al. | |
| 5,213,027 A | 5/1993 | Tsotsos et al. | |
| 5,237,914 A | 8/1993 | Carstensen | |
| 5,259,299 A | 11/1993 | Ferraro | |
| 5,333,540 A | 8/1994 | Mazzocchi | |
| 5,347,978 A | 9/1994 | Zuran | |
| 5,355,868 A | 10/1994 | Haen | |
| 5,368,009 A | 11/1994 | Jones | |
| 5,404,795 A | 4/1995 | Coble | |
| 5,553,601 A | 9/1996 | Parker et al. | |
| 5,678,531 A * | 10/1997 | Byers | A47J 37/0704 126/25 R |
| 5,884,555 A | 3/1999 | Chang | |
| 5,911,812 A | 6/1999 | Stanek et al. | |
| 5,960,782 A | 10/1999 | Clements et al. | |
| 6,000,389 A | 12/1999 | Alpert | |
| 6,024,081 A | 2/2000 | Libertini, Jr. | |
| 6,039,039 A | 3/2000 | Pina, Jr. | |
| 6,064,042 A | 5/2000 | Glucksman et al. | |
| 6,114,665 A | 9/2000 | Garcia et al. | |
| 6,153,857 A | 11/2000 | Gunnels | |
| 6,158,330 A | 12/2000 | Andreas | |
| 6,187,359 B1 | 2/2001 | Zuccarini | |
| 6,260,478 B1 | 7/2001 | Harneit | |
| 6,308,616 B1 | 10/2001 | Johnson | |
| 6,508,165 B2 | 1/2003 | Johnson | |
| 6,546,845 B1 | 4/2003 | Lanzilli | |
| 6,640,695 B2 | 11/2003 | Stark | |
| 6,705,307 B2 | 3/2004 | Alden et al. | |
| 6,892,722 B1 | 5/2005 | Francies, III et al. | |
| 6,931,985 B1 | 8/2005 | Attie | |
| 7,163,011 B2 | 1/2007 | Pestrue | |
| 7,686,010 B2 | 3/2010 | Gustavsen | |
| 7,905,225 B2 | 3/2011 | Contarino, Jr. | |
| 8,261,732 B2 | 9/2012 | Contarino, Jr. | |
| 2002/0017290 A1 * | 2/2002 | Hines, Jr. | A47J 37/01 126/41 R |
| 2002/0020303 A1 | 2/2002 | Johnson | |
| 2003/0145740 A1 | 8/2003 | Stark | |
| 2003/0213484 A1 | 11/2003 | Alden et al. | |
| 2004/0112226 A1 | 6/2004 | Johnston et al. | |
| 2006/0000365 A1 | 1/2006 | Attie | |
| 2006/0102015 A1 | 5/2006 | Baker et al. | |
| 2006/0112948 A1 | 6/2006 | Ducate, Sr. et al. | |
| 2006/0191528 A1 | 8/2006 | Spangrud | |
| 2007/0163568 A1 | 7/2007 | Murray et al. | |
| 2007/0277800 A1 | 12/2007 | Chiang | |
| 2009/0078246 A1 | 3/2009 | Leavens et al. | |
| 2009/0101024 A1 | 4/2009 | Button | |
| 2010/0124596 A1 | 5/2010 | Nelson | |
| 2010/0147285 A1 | 6/2010 | Seong | |
| 2014/0251160 A1 | 9/2014 | Contarino | |
| 2015/0027432 A1 | 1/2015 | Contarino | |

* cited by examiner

APPARATUS FOR CONVERTING HINGED-LID COOKING GRILLS FOR COOKING PIZZA

CROSS-REFERENCE TO RELATED APPLICATIONS

This application is a Continuation of U.S. patent application Ser. No. 14/203,965, filed Mar. 11, 2014 and is based on, and claims the benefit of priority to, U.S. Provisional Patent Application No. 61/776,132, filed Mar. 11, 2013, the entire contents of which are fully incorporated herein by reference.

FIELD OF THE INVENTION

The present invention related generally to a cooking apparatus. More particularly, the present invention relates to an apparatus for adapting conventional hinged-lid cooking grills, especially typical gas grills, to cook pizzas and other foods in an improved manner.

BACKGROUND

Figure 1:
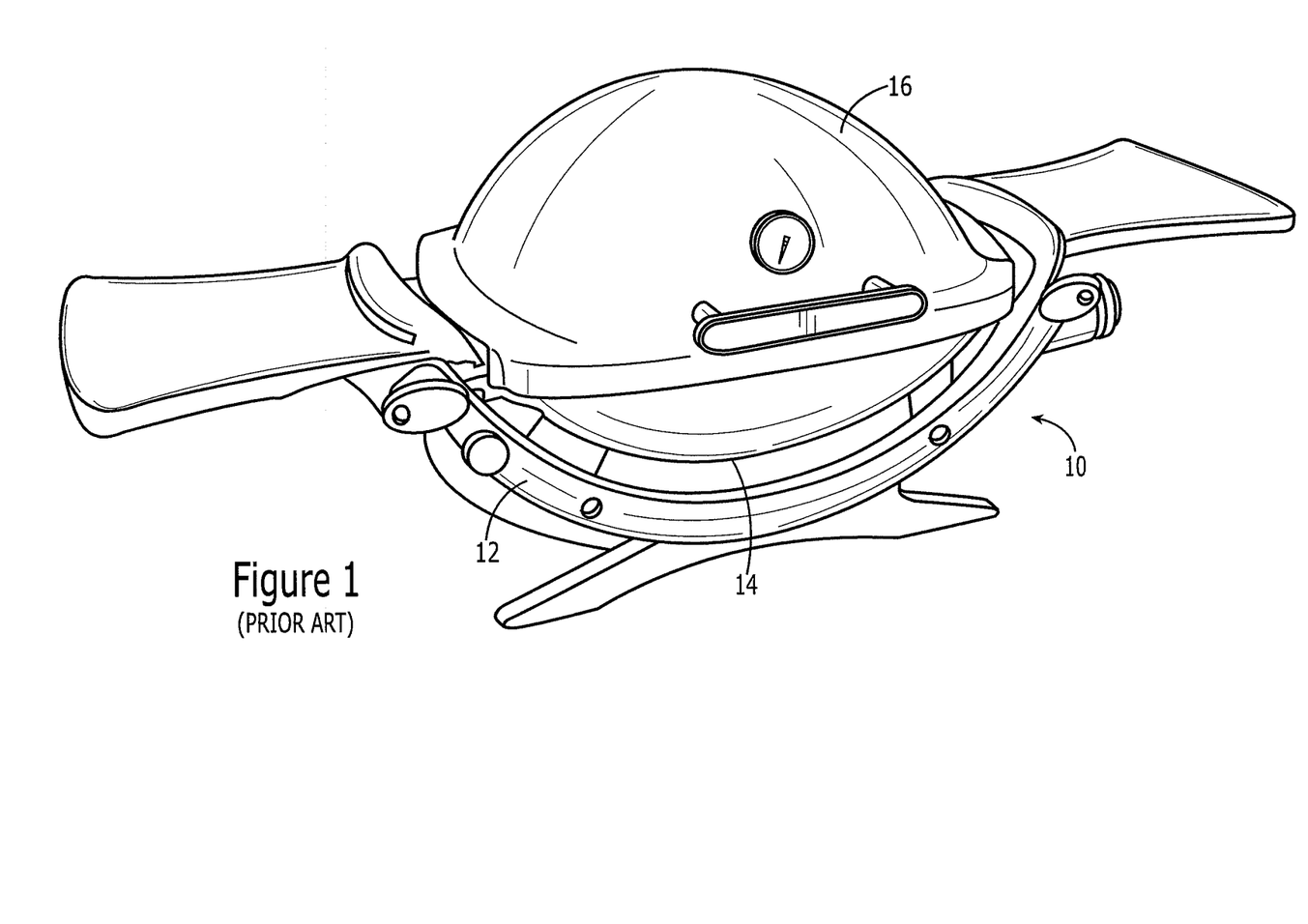
FIG. 1 shows a conventional hinged-lid grill exemplary of the prior art, showing the grill with the lid in a closed position.
Figure 2:
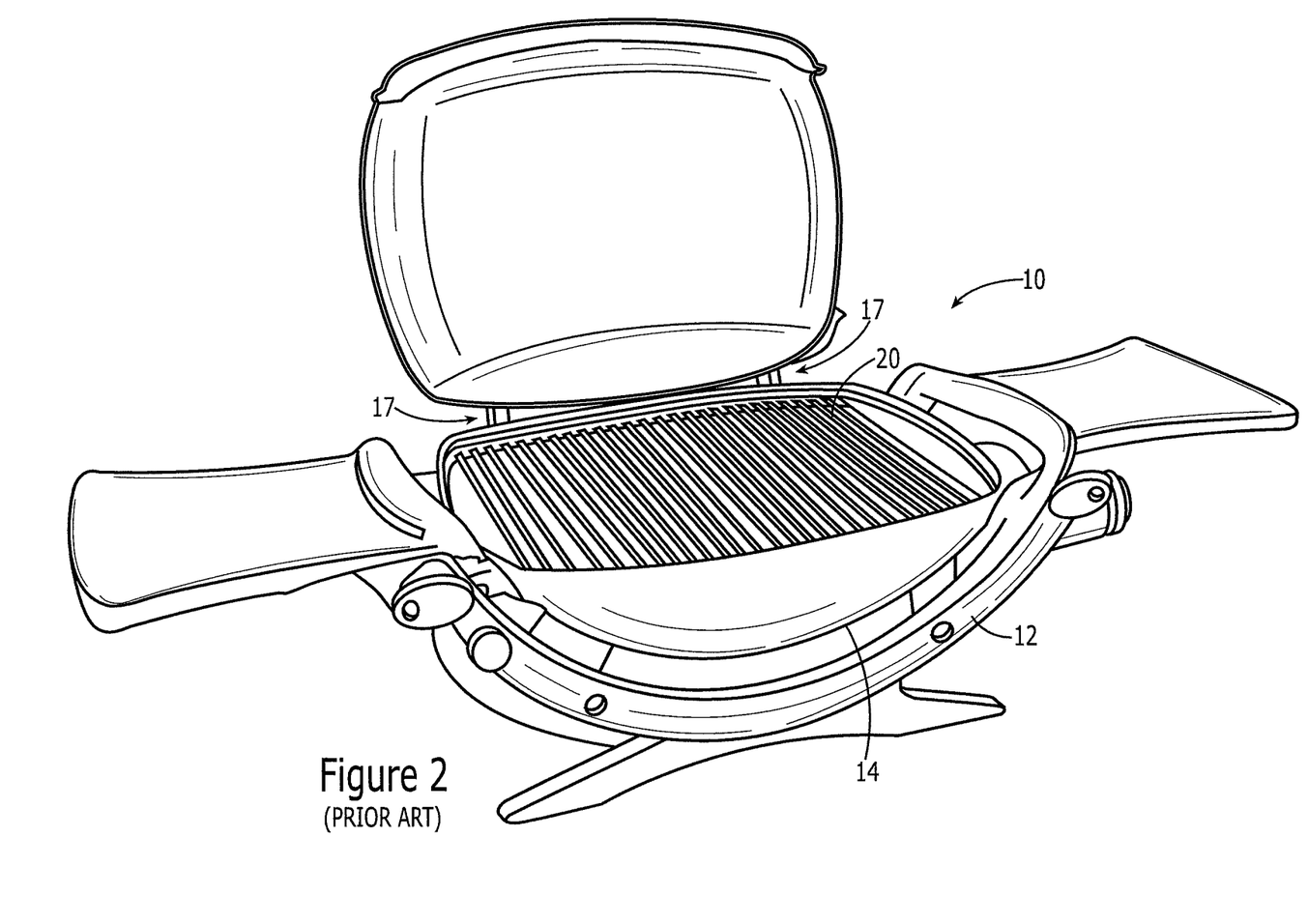
FIG. 2 shows the hinged-lid grill of FIG. 1, showing the grill with the lid in an open position.

People often wish to cook on their outdoor cooking grills foods, such as pizza, that are not necessarily traditionally considered grill foods. An exemplary hinged-lid grill 10 is shown in FIGS. 1 and 2. The grill 10 is exemplary in that it includes a frame 12 supporting a lower base portion 14 to which an upper lid 16 is hingedly attached, typically toward the rearward edge of the base portion 12, by hinges 17, as best shown in FIG. 2. The base portion 14 and lid 16 cooperate to define therebetween a cooking chamber 18. The cooking chamber houses a grilling surface such as grate 20, as shown in FIG. 2.

A heat source is housed below the grate 20. The cooking chamber may be heated by charcoal, wood or even an electric heating element placed in the bottom of the cooking chamber, or more typical for this particular style of grill, by liquid fuel, such as natural gas or propane.

With respect to pizza, the desired cooking temperature for many pizza recipes is very high, on the order of about 600 to 750° Fahrenheit or more. It is important that the temperature within the cooking chamber be particularly consistent, both spatially (the temperature is substantially the same everywhere within the cooking chamber) and temporally (the temperature does not fluctuate significantly with time).

First, the temperature should be spatially consistent so all of the ingredients cook properly. A common problem with cooking pizza, particularly in grills, is that the crust cooks too fast relative to the ingredients on top of the crust such that the crust becomes too dry or even burns before all of the ingredients on top of the pizza are fully cooked or properly melted. Thus, temperature uniformity as a function of height above the heating element (e.g., charcoal, wood, or flame burners) is desired. Furthermore, if the temperature is not uniform in the horizontal direction, some sections of the crust may burn before other sections of the crust are fully baked.

Even further, maintaining a consistent temperature over time also is often important to cooking pizza (as well as many other foods). First, a consistent, proper temperature will, of course, cause the food to cook faster than a fluctuating temperature and temperature fluctuations can lead to the food not cooking properly all the way through to the center.

Often, it is particularly difficult to maintain consistent temperature in cooking grills for several reasons. First, in a conventional hinged-lid grill, such as many conventional gas grills, the grill must be opened (by pivoting the hinged lid upwardly to an open position) to place food on the grill, to remove food from the grill, and to observe the cooking food. Since heated air rises relative to surrounding cooler air, each time the grill's lid is opened, essentially all of the heated air in the cooking chamber rises and escapes, requiring the chamber to heat up again after the lid is pivoted downwardly to close the grill's cooking chamber. Not only could this cause it to take longer to cook the food, but it could lead to uneven cooking since the air in the space beneath the food is likely to remain much hotter or at least heat up much more quickly than the air in the space above the pizza after each opening of the lid. This is particularly problematic with respect to cooking pizzas because the pizza dough and/or the solid surface on which the pizza must sit (such as a pizza stone) forms a large uninterrupted barrier between the air space below the pizza and the air space above the pizza. Also, since pizza recipes often require extremely high temperatures, temperature differentials can be significant.

SUMMARY

The present invention pertains to an accessory for adapting cooking grills, especially grills including a hinged lid, for improved cooking of pizzas and other foods. The accessory includes a body adapted to be disposed between the base and lid portions of the cooking grill, the body being configured to mate with an inner surface of the lid and to cooperate with the base and lid portions to define therebetween a substantially-enclosed cooking chamber when the lid is positioned in a partially-closed position between the open and closed positions.

A hinged-lid grill including the accessory is provided also.

BRIEF DESCRIPTION OF THE FIGURES

An understanding of the following description will be facilitated by reference to the attached drawings, in which.

DETAILED DESCRIPTION

Figure 3:
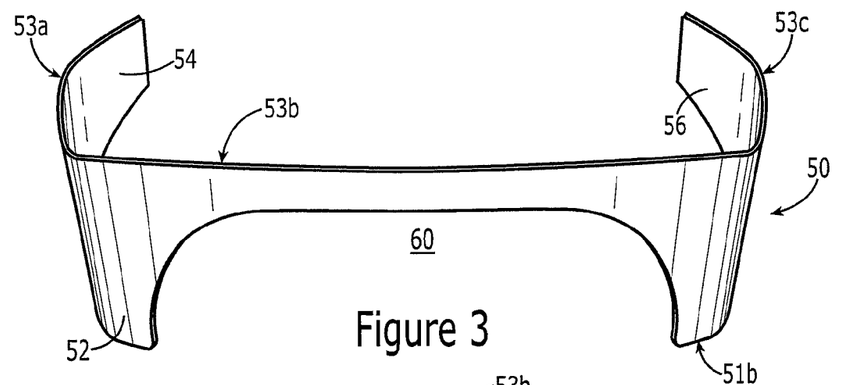
FIG. 3 is a front view of a grill accessory in accordance with an exemplary embodiment of the present invention
Figure 4:
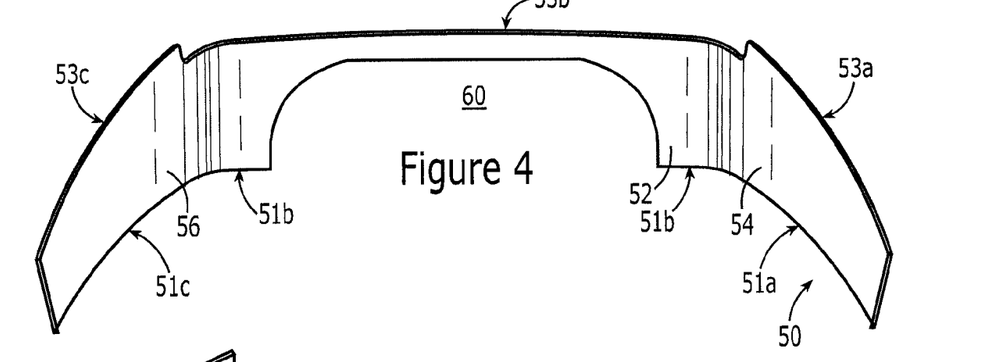
FIG. 4 is a rear view of the grill accessory of FIG. 3.
Figure 5:
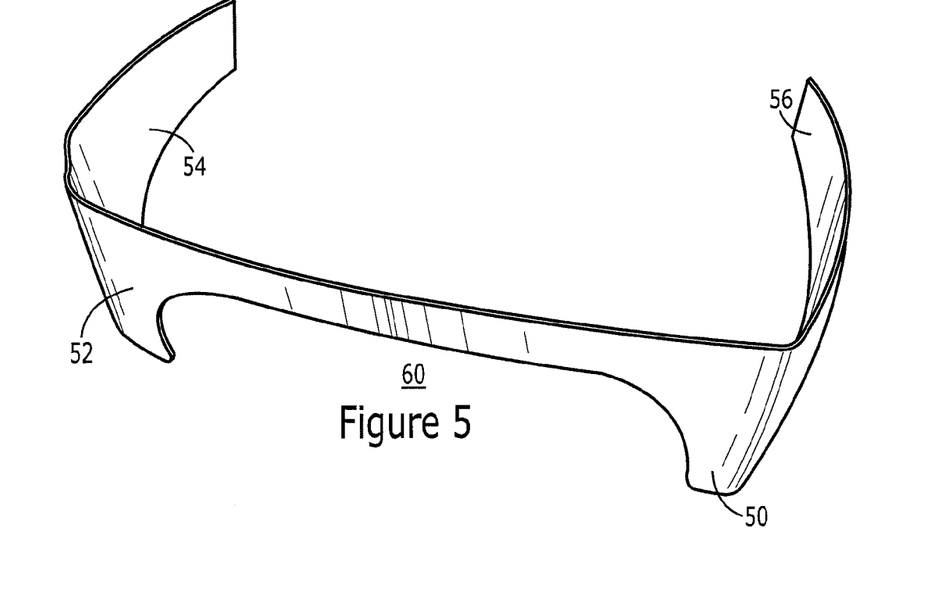
FIG. 5 is a front perspective view of the grill accessory of FIG. 3

The present invention provides an accessory that may be used in conjunction with a conventional hinged-lidded grill, such as grill 20 shown in FIGS. 1 and 2. An exemplary accessory 50 is shown in FIGS. 3-5 that is compatible with the grill 20 shown in FIGS. 1 and 2. Generally, the accessory 50 is constructed in a shape complementary to the grill structure to bridge a gap between the lower base portion 14 and the upper lid 16 when the lid is in a partially open position, to support the lid and to define a substantially-closed cooking chamber, as discussed in greater detail below and as will be appreciated from FIG. 8. The accessory can be used to convert a hinged-lid grill 150 into a pizza oven providing more consistent temperature variability, thereby yielding better cooking results.

Referring now to FIGS. 3-5, the exemplary accessory 50 is constructed as a unitary body. In this example, the accessory 50 is formed of stainless steel from substantially planar stainless steel sheet stock, and then bending the accessory blank to form a front wall 52 and side walls 54, 56 extending generally transversely to the front wall 50. By way of example, the accessory blank may be formed by die cutting, laser cutting or any other suitable method. In alternative embodiments, the accessory 50 may not be a unitary body and/or may not be so formed. By way of example, the accessory can be made of any material that is sufficiently heat resistant to withstand the maximum temperatures conventionally generated in a pizza oven or grill (it should probably be able to withstand at least 750 degrees Fahrenheit) and sufficiently strong to support the weight of the grill's lid 16. Steel or another metal or ceramic material are preferred. Any suitable construction method may be employed to form the accessory 50.

The accessory 50 has a lower edge 51 that is configured to cause the accessory 50 to rest in a stable manner on the grate 20 of the grill 10 and/or on support structure of the grill, e.g., supports for the grate 20. In this exemplary embodiment, each of the front and side walls 52, 54, 56 has lower edges 51*a*, 51*b*, 51*c* that are substantially flat and co-planar, to cause the accessory to rest in a stable manner on a substantially planar support surface, such as the grill's grate, as will be appreciated from FIGS. 3, 4 and 6.

The accessory 50 has an upper edge 53 that is configured to cause the accessory 50 to mate with a partially-open lid 16 of the grill. Preferably, the upper edge 53 is contoured to mate with any irregular structure of the lid, so as to conform to any contours of the inner portion of the lid 16, and thus to avoid large gaps likely to release excessive amounts of hot air from the cooking chamber 18 during cooking. Accordingly, each accessory may be constructed to specifically mate with a corresponding grill/grill type. In this exemplary embodiment, each of the side walls 52, 56 has upper edges 53*a*, 53*c* that are substantially flat and co-planar, to cause the accessory to mate with substantially-planar lid structure, as will be appreciated from FIGS. 3, 4 and 6. In this exemplary embodiment, portions of the upper edges 53*a*, 53*b*, 53*c* are contoured out of plane to mate with corresponding portions of the grill's lid structure, as will be appreciated from FIGS. 3, 4, and 6.

Figure 6:
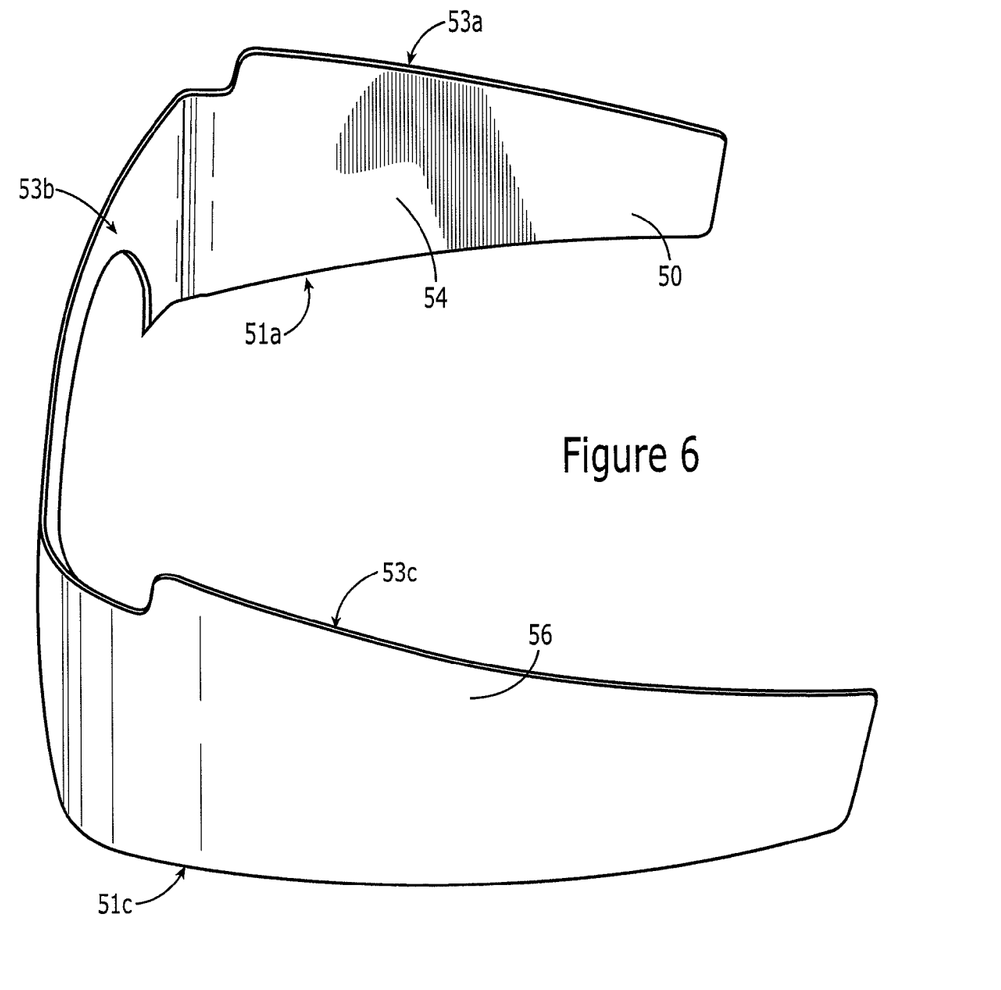
FIG. 6 is a side perspective view of the grill accessory of FIG. 3.

As will be appreciated from FIG. 6, the accessory 50 has a generally wedge-shaped profile when viewed from the side, to substantially close a wedge-shaped opening between the lower base 14 and lid 16 when the hinged lid is partially open.

As best shown in FIGS. 3, 4 and 5, the front wall 52 of the accessory 50 defines a window 60. The window is dimensioned to be large enough both in the horizontal direction and in the vertical direction to allow easy insertion and removal of a pizza from the cooking chamber. Thus, the window 60 allows a pizza to be removed from the cooking chamber 18, e.g., using a pizza peel, without having to further open the grill's lid 16, which would allow essentially all of the heat to escape. Preferably, the window is also dimensioned to be small enough so as not to allow a significant amount of heat to escape through the opening. Since heated air tends to rise, the vertically oriented side window 60 will not let excessive amounts of heat escape from the cooking chamber 18 through window 60. The window permits constant visual access to the food cooking inside the cooking chamber without the need to remove the food from the cooking chamber.

Figure 10:
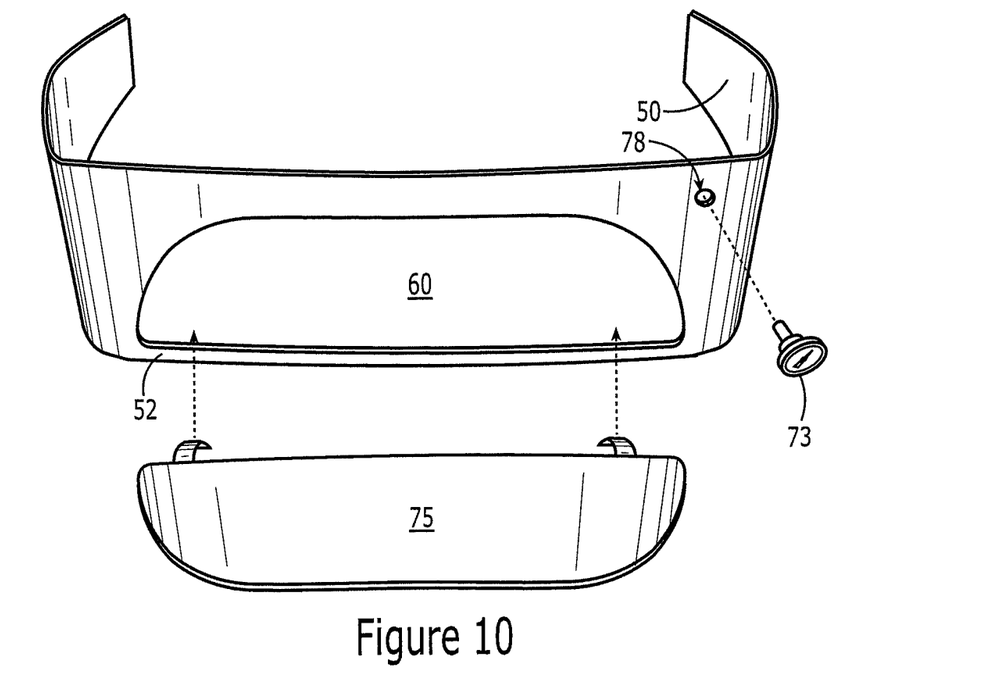
FIG. 10 is a perspective view of an alternative embodiment of the accessory of FIG. 3, show with a hinged door for closing the window.

Optionally, a cover or door 75 (FIG. 10) may be provided to selectively close the window 60. By way of example, the door may be hingedly attached to the front wall 52. Optionally, the front wall may define an opening 78 for supporting a conventional thermometer 73. This may be particularly useful when the accessory 50 is designed for a grill that does not already include its own thermometer.

Figure 12:
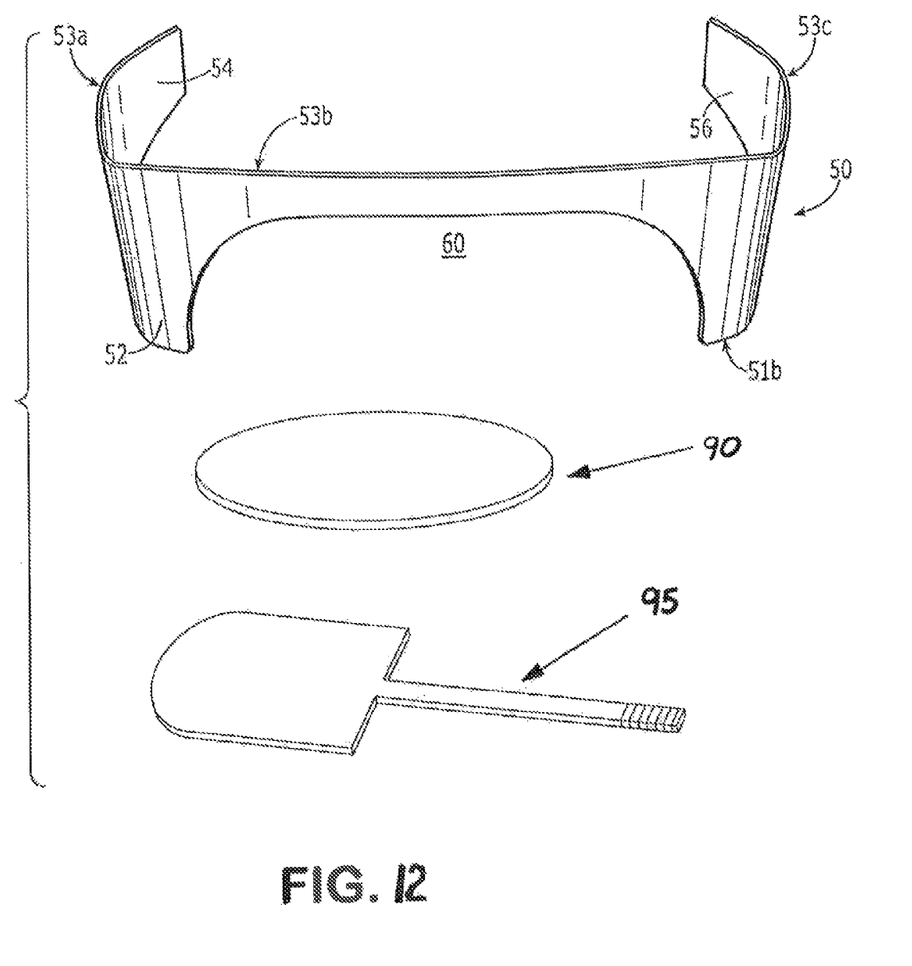
FIG. 12 is a perspective view of a novel combination including a pizza peel of the prior art, and a cooking surface of the prior art.

The insert accessory may be sold in a kit along with a cooking surface 90, such as a pizza stone, pizza pan and/or a conventional pizza peel 95. For cooking foods other than pizzas and the like, the apparatus may be sold with a skillet (not shown) or other or additional cooking apparatus.

Figure 9:
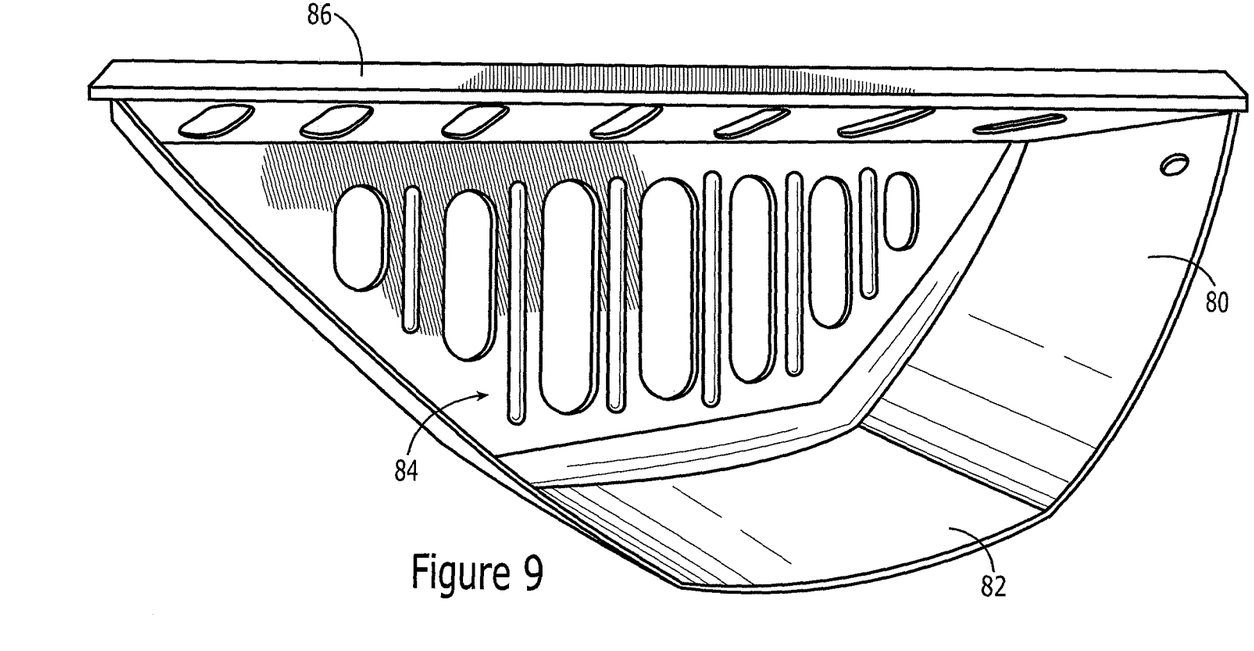
FIG. 9 is a perspective view of a supplemental fuel basket for use in conjunction with the grill accessory of FIG. 3.

In a certain embodiment, the apparatus further includes a secondary fuel basket. Optionally, certain hardwoods may be employed or added to charcoal in the secondary fuel basket to impart additional flavor to the pizza. Alternatively, such hardwoods or liquid "smoky" flavoring agents may be added to a smoking basket. An exemplary secondary fuel basket 80 is shown in FIG. 9. The basket includes a sidewall 82 and a floor 84 for supporting a supply of fuel in the basket 80. In this example, the basket further includes an attachment member 86 for mounting the basket to the accessory 50. In the exemplary embodiment shown in FIG. 9, the attachment member is provided as flange dimensioned to permit the basket 80 to hang from an upper edge of the accessory 50. Alternatively, the basket may omit the attachment member and may simply be placed on the grill's grate. The basket 80 is configured to support a secondary supply of fuel above the primary supply of fuel in the fuel chamber beneath the grate 20, and more particularly, is positioned to be open and to vent heat directly to a space above the cooking surface. In this manner, heat rising from the basket 80 tends to heat only (or primarily) the air above the grate 20 and/or any cooking surface, and tends to balance the heat distribution above and below grate 20, and thus promotes temperature uniformity as a function of height above the lower fuel chamber.

Figure 7:
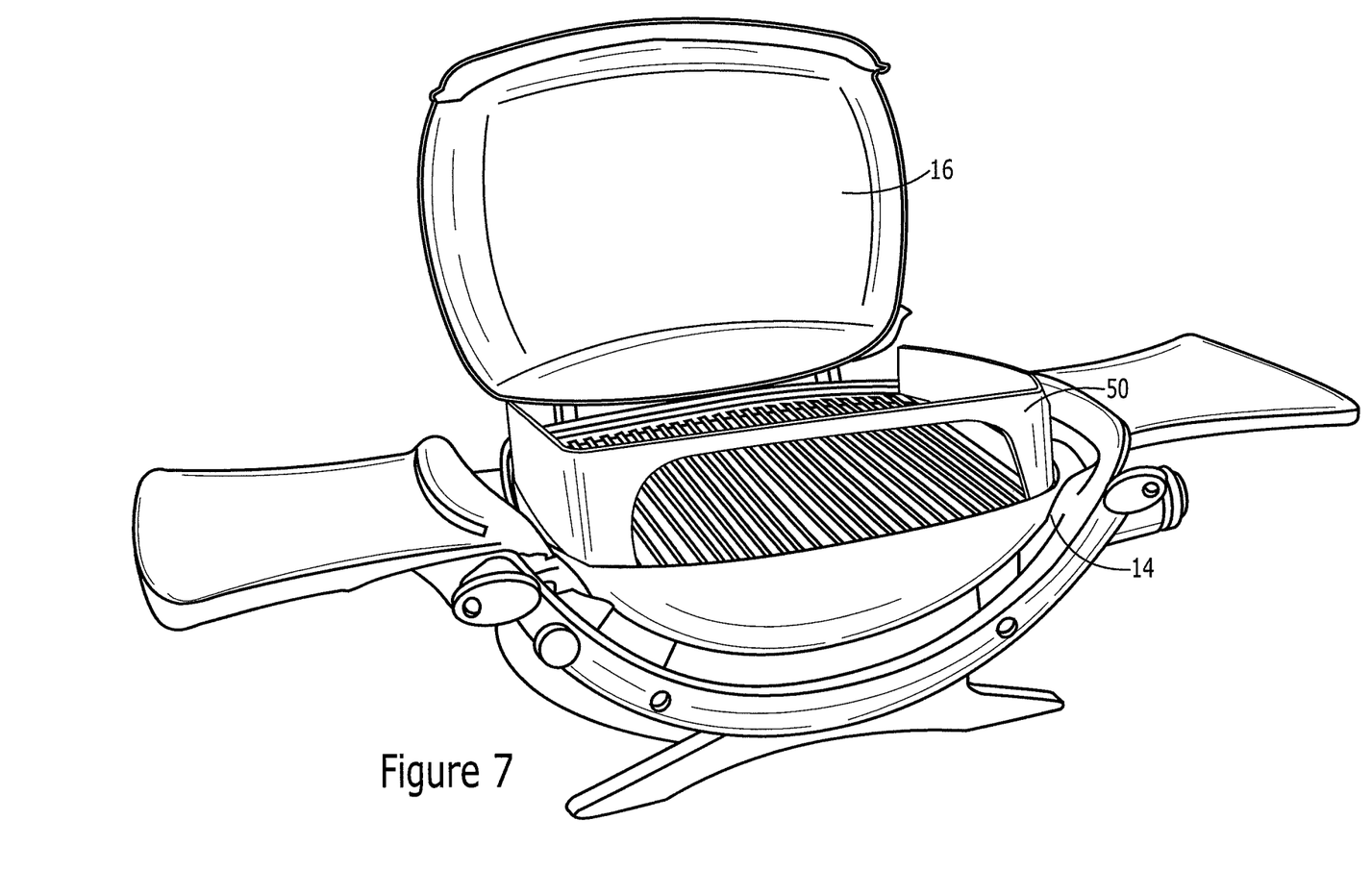
FIG. 7 is a perspective view of the grill accessory of FIG. 3, shown mounted on the grill of FIG. 1, showing the grill lid in an open position.
Figure 8:
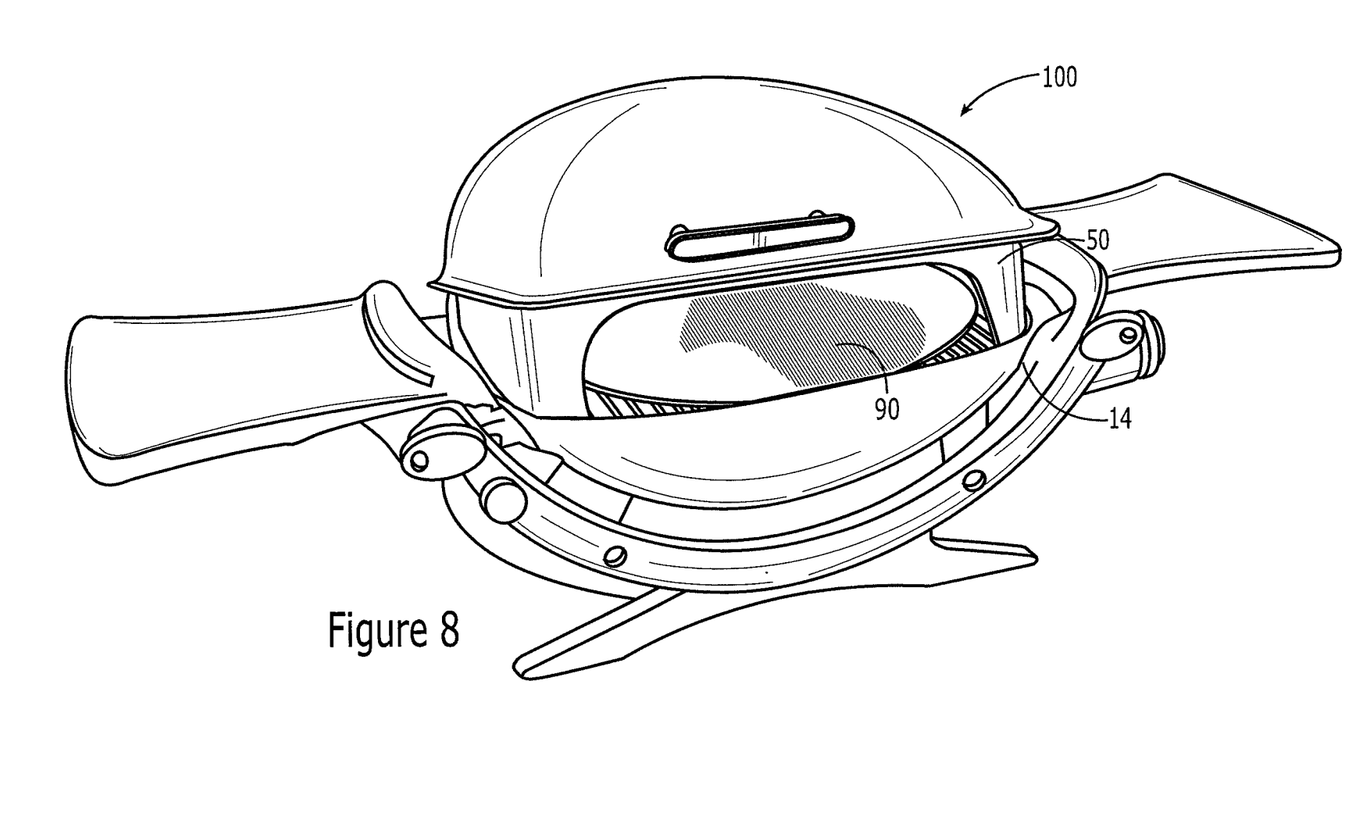
FIG. 8 is a front perspective view of the grill accessory of FIG. 3, shown mounted on the grill of FIG. 1, showing the grill lid in a closed position.

In use, the exemplary embodiment of the accessory of FIGS. 3-6 may be used in conjunction with a conventional hinged-lid grill described above by opening the grill's lid and placing the accessory 50 onto the grill's grate 20 and/or supports for the grate 20, as shown in FIG. 7, so that the accessory 50 is supported in a stable manner relative to the grate 20. The lid 16 of the grill 10 may then be moved from the open position (as shown in FIG. 7) toward a closed position into a partially-closed position, at which point an inner surface of the lid comes to rest against the upper edges 53*a*, 53*b*, 53*c* of the accessory 50, as shown in FIG. 8. At this point, the accessory 50 supports the lid 16 and cooperates with the lid 16 and lower base portion 14 to define a substantially-closed cooking chamber 18, as shown in FIG. 8. In this exemplary embodiment, the accessory effectively closes a gap between the lid 16 and base portion 14 on three sides of a generally-rectangular-shaped grill, and the fourth side is substantially closed by mating of the lid and base portion adjacent the hinge(s). Thus, the accessory can be used to convert a hinged-lid grill into an oven 100 providing more consistent temperature variability, thereby yielding better cooking results.

In embodiments including the secondary fuel basket 80, the basket 80 may be mounted to the accessory 50 or placed on the grate and be loaded with secondary fuel/smoking agents prior to movement of the lid 16 to the partially closed position.

The apparatus described herein may be implemented in any number of ways, including, but not limited to (1) as an aftermarket add-on, (2) as a removable feature of an original grill, or (3) as a permanent part of the grill.

Figure 11:
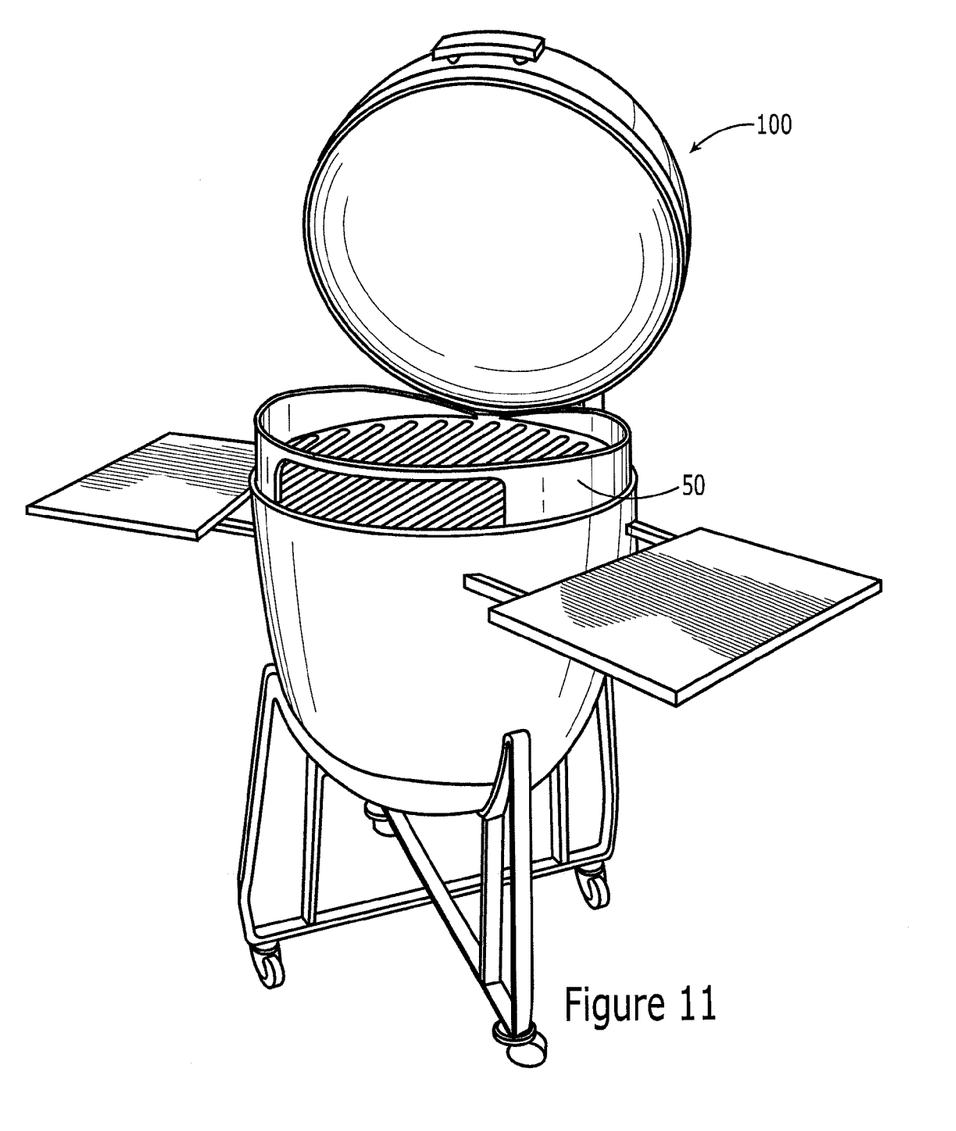
FIG. 11 is a perspective view of a C-shaped grill accessory of the present invention shown in a conventional kamado grill exemplary of the prior art.

While the exemplary embodiment described in detail herein is configured to work with a generally rectangularly-shaped grill grate, and thus is generally U-shaped, such as those of many conventional gas grills, this is merely exemplary. The accessory may be otherwise shaped, such as in generally arcuate fashion and thus may be generally C-shaped, e.g., to accommodate a grill grates and/or grills having a generally circular shape and a hinged lid, as is typical of a kamado-style grill. FIG. 11 is a perspective view of a C-shaped grill accessory of the present invention shown in a conventional kamado grill exemplary of the prior art.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An accessory for a cooking grill, the cooking grill including a base and a lid hingedly attached to the base and movable between an open position and a closed position, a gap being defined between the base and the lid when the lid is in a partially-closed position between the open position and the closed position, the accessory comprising:
a body adapted to be disposed between the base and lid portions of the cooking grill to support the lid in the partially-closed position, the body being shaped to be complementary to a corresponding shape of the base and lid to bridge and close the gap between the base and lid portions while supporting the lid in the partially-closed position, the body having a lower edge configured to mate with the base and an upper edge contoured to conform to and mate with an inner surface of the lid, the body cooperating with the base and lid portions when positioned to bridge and close the gap to thereby define an enclosed cooking chamber while the lid is supported by the body in the partially-closed position.

2. The accessory of claim 1, wherein said base and said lid each define a front wall and a pair of sidewalls extending generally transversely from said front wall, and wherein said body correspondingly defines a respective front wall and a respective pair of sidewalls extending generally transversely to said front wall.

3. The accessory of claim 2, wherein said accessory is constructed as a unitary body.

4. The accessory of claim 2, wherein said accessory is constructed by cutting a blank from a substantially planar sheet stock and subsequently bending portions of the blank out of plane to form the body.

5. The accessory of claim 2, wherein said front wall of said body defines a window.

6. The accessory of claim 5, further comprising a door hingedly attached to said front wall of said body and pivotable between open and closed positions to selectively close said window.

7. The accessory of claim 1, wherein said lower edge of said body is configured to support the accessory on a planar surface.

8. The accessory of claim 1, wherein said lower edge of said body is configured to support the accessory on a grate of the cooking.

9. The accessory of claim 1, wherein said lower edge of said body is configured to support the accessory on a plurality of supports for a grate of the cooking grill.

10. The accessory of claim 1, wherein said body has a generally wedge-shaped profile when viewed from a side.

11. The accessory of claim 1, wherein the body is generally U-shaped for use with a generally rectangularly-shaped cooking grill.

12. The accessory of claim 1, wherein the body is generally C-shaped for use with a generally circularly-shaped cooking grill.

13. The accessory of claim 1, further comprising a secondary fuel basket, the secondary fuel basket comprising:
a sidewall; and
a floor cooperating with the sidewall for supporting a supply of fuel.

14. The accessory of claim 13, wherein said secondary fuel basket further comprises an attachment member for supporting the secondary fuel basket on the body.

15. A combination comprising the accessory of claim 1, a cooking surface, and a peel.

16. A combination comprising the accessory of claim 1 and a cooking grill.

17. The combination of claim 16, further comprising a cooking surface and a peel.

18. A cooking oven comprising:
a cooking grill comprising:
a frame;
a base supported on the frame, said base having front, rear and side portions;
a cooking grate supported on the base; and
a lid having respective front, rear and side portions, the rear portion of the lid being hingedly-attached to the rear portion of the base, the lid being movable between an open position and a closed position; and
an accessory comprising:
a body adapted to be disposed between the base and lid portions of the cooking grill, the body being configured with corresponding front and side portions shaped complementarily to said front and side portions of said base and said lid, said respective front and side portions having an upper edge contoured to mate with an inner surface of the lid, the body thereby being configured to close a gap between the base and lid and to support the lid when the lid is in a partially-closed position between the open and closed positions and the body is positioned with its front and side portions between the respective front and side portions of the base and lid, the body thereby cooperating with the base and lid portions to define therebetween an enclosed cooking chamber while the lid is supported by the body in the partially-closed position.

19. An accessory for a cooking grill, the cooking grill including a base and a lid matable in a closed position, the accessory comprising:
a body adapted to be disposed between peripheral portions of the base and lid portions of the cooking grill, the body having a generally wedge-shaped profile when viewed from a side, the body being shaped to support the lid in a position other than the closed position while bridging and closing a wedge-shaped gap between the peripheral portions of the base and lid when the lid is in the position other than the closed position, and to thereby cooperate with the base and supported lid to define therebetween an enclosed cooking chamber accessible via a window defined by the body.

20. An accessory for a cooking grill, the cooking grill including a base and a lid hingedly attached to the base and movable between an open position and a closed position, the lid being movable to a partially-closed position in which a wedge-shaped gap is defined between peripheral portions of the base and the lid, the accessory comprising:

a body defining an open window and having a lower edge contoured to mate with the peripheral portion of the base and an upper edge contoured to mate with the respective peripheral portion of the lid, the upper edge extending in sloped fashion relative to said lower edge to provide the body with a wedge-shaped profile corresponding to the wedge-shaped gap defined between the base and the partially-closed lid, the body being further configured to extend between the base and partially-closed lid to bridge and close the wedge-shaped gap therebetween, and to support the lid in the partially-closed position, whereby the wedge-shaped body is thereby shaped to cooperate with the base and lid portions to define a cooking chamber that is enclosed except for the open window.

\* \* \* \* \*